Sept. 20, 1932.  H. HUBBARD  1,878,853
FERTILIZER DISTRIBUTOR
Filed May 21, 1931
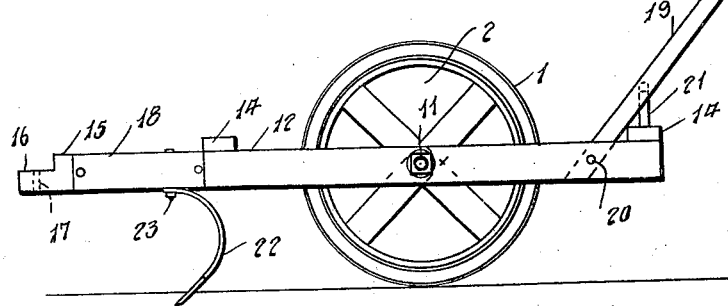
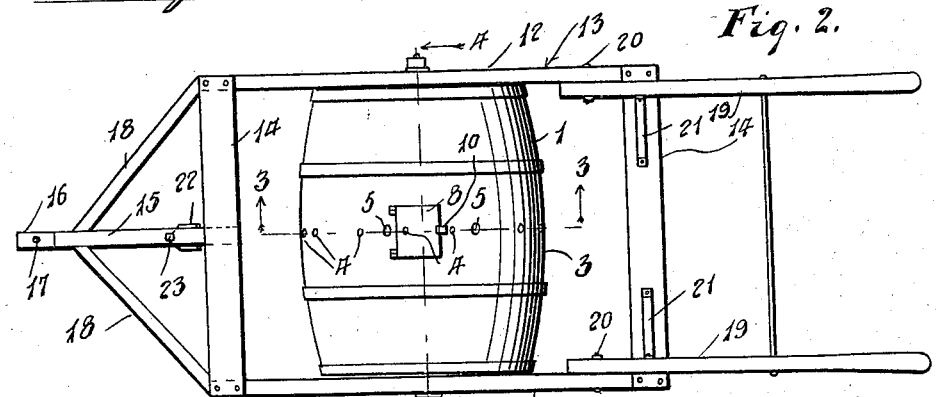
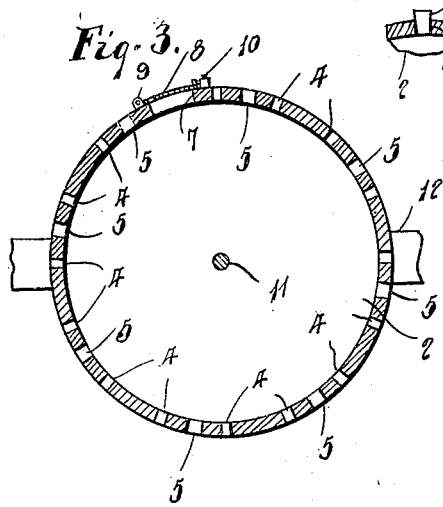
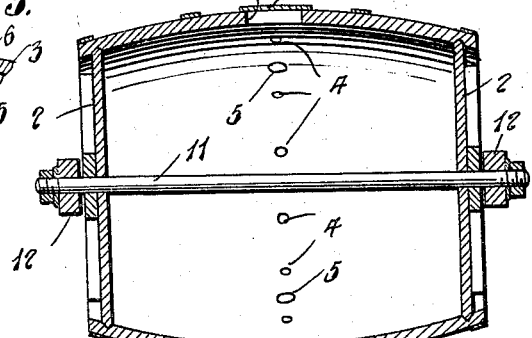
Inventor
H. Hubbard.

Patented Sept. 20, 1932

1,878,853

UNITED STATES PATENT OFFICE

HUGH HUBBARD, OF ORANGE, TEXAS, ASSIGNOR TO W. H. STARK

FERTILIZER DISTRIBUTOR

Application filed May 21, 1931. Serial No. 539,059.

The invention relates to a machine for distributing finely divided or powdered fertilizer and has for its object the provision of a fertilizer distributor that is extremely reasonable in cost of manufacture, that is thoroughly practical in operation, and is also extremely durable and will be described in detail hereinafter and will be found illustrated in the accompanying drawing, in which Figure 1 is a side view in elevation of the improved fertilizer distributor, Figure 2 is a top plan view, Figure 3 is a fragmentary longitudinal sectional view, taken transversely of the distributing cylinder on a plane indicated by the line 3—3 of Figure 2, Figure 4 is a transverse sectional view on a plane indicated by the line 4—4 of Figure 2, and Figure 5 is a fragmentary sectional view showing one of plugged openings of the cylinder.

In the drawing similar reference characters are used to designate corresponding parts in all the views.

The fertilizer distributor comprises a barrel-shaped hollow member 1 having its circumferential wall bulged between the ends 2 of the cylinder as shown at 3, and the circumferential wall provided with a series of small openings 4, and a smaller number of larger openings 5, the number of smaller openings 4 being illustrated as sixteen in number while the larger openings are illustrated as eight in number, and equally distributed relatively to the smaller openings. In event it is desired to distribute a large quantity of the finely divided or powdered fertilizer contained within the cylinder all of the openings may be utilized for this purpose, but if it is desired to more or less limit the quantity of fertilizer distributed, the larger openings may be provided with plugs 6 as shown in Figures 3 and 5, or the smaller openings may be provided with plugs and the larger openings left free, or any other arrangement of plugging the openings as may be selected may be employed to distribute the proper amount of fertilizer.

A filling opening 7 is provided in the bulged portion 3 and 8 indicates a lid or cover for said opening 7 that is pivoted as shown at 9, and 10 designates a latch to hold the lid or cover 8 closed. The cylinder 1 is journaled on an axle 11 that is secured in the side beams 12 of a rectangular frame 13, 14 designating cross beams connecting the ends of said side beams 12. 15 designates a draft beam secured to the end cross beam 14 and having a reduced portion 16 at its front or free end with a vertical opening 17 therein to which may be secured a suitable draft appliance (not shown). 18 indicates braces connecting the front ends of the side beams 12 and the draft beam 15. 19 indicates handle bars secured as shown at 20 to the side beams 12, and 21 are braces for said handle bars.

22 indicates a plow share secured as shown at 23 to the draft beam 15 and is arranged to provide furrow to receive the fertilizer delivered through the openings 4 and 5 in the hollow cylinder 1.

What is claimed is:—

1. In a fertilizer distributor, a barrel-shaped container adapted to hold fertilizer for distribution and having a series of openings arranged around the container and located in the bulged portion thereof, said openings being of diverse diameters, plugs for selectively closing said openings for varying the delivery of material from the container, and a frame mounting said container for rotation.

2. In a fertilizer distributor, an open rectangular frame, a shaft supported by said frame, a hollow cylindrical container mounted for rotation on said shaft the cylindrical wall of said container bulged outwardly intermediate of its ends and provided with spaced openings arranged in the bulged portion, said openings being of diverse diameters, plugs for selectively closing said openings for varying the delivery of material from the container, a draft beam secured to said frame, and handle bars secured to the frame.

In testimony whereof I affix my signature.

HUGH HUBBARD.